Figure 1:
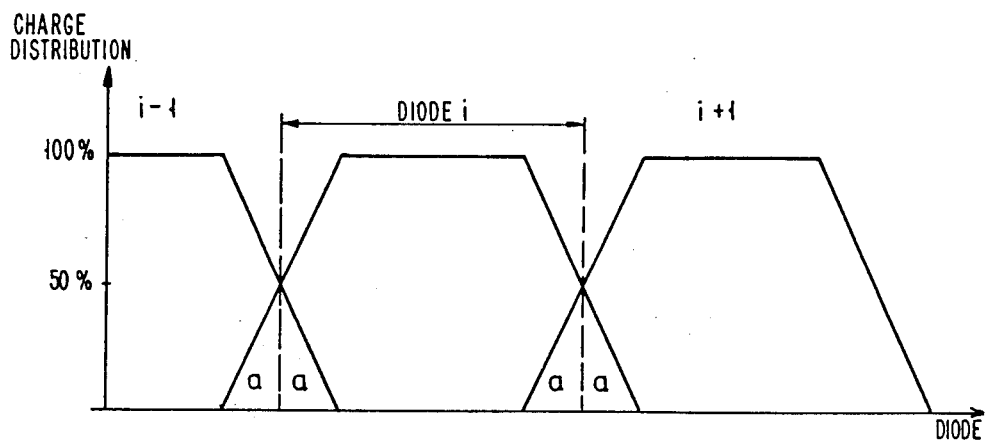

United States Patent [19]

Ruppert

[11] Patent Number: 4,628,211
[45] Date of Patent: Dec. 9, 1986

[54] CIRCUIT ARRANGEMENT FOR CROSSTALK COMPENSATION IN ELECTRO-OPTICAL SCANNERS

[75] Inventor: Werner Ruppert, Schonaich, Fed. Rep. of Germany

[73] Assignee: International Business Machines Corporation, Armonk, N.Y.

[21] Appl. No.: 588,468

[22] Filed: Mar. 6, 1984

[30] Foreign Application Priority Data

Mar. 30, 1983 [EP] European Pat. Off. ......... 83103166.1

[51] Int. Cl.[4] .............................................. H04N 3/14
[52] U.S. Cl. ..................................... 250/578; 358/213
[58] Field of Search ............... 358/212, 213, 160, 340; 250/211 J, 578; 357/24 CR

[56] References Cited

U.S. PATENT DOCUMENTS

| 3,800,078 | 3/1974 | Cochran et al. | 358/160 |
| 3,800,079 | 3/1974 | McNeil et al. | 358/160 |
| 3,856,989 | 12/1974 | Weimer | 250/578 |
| 4,345,148 | 8/1982 | Pines et al. | 250/578 |
| 4,472,638 | 9/1984 | Nishizawa et al. | 250/211 J |

Primary Examiner—David C. Nelms
Assistant Examiner—Stephone Allen
Attorney, Agent, or Firm—E. Ronald Coffman

[57] ABSTRACT

A circuit is provided to compensate for crosstalk between individual cells of a photodetector array by combining the signals produced by adjacent cells in the array together with a predetermined crosstalk factor.

5 Claims, 3 Drawing Figures

CIRCUIT ARRANGEMENT FOR CROSSTALK COMPENSATION IN ELECTRO-OPTICAL SCANNERS

BACKGROUND OF THE INVENTION

The invention concerns a circuit arrangement for compensating for the crosstalk occurring between adjacent cells of a linear photodiode array in a scanner for an illuminated object. Scanners of the type addressed by this invention are generally described in U.S. Pat. Nos. 3,800,078 and 3,800,079. The object to be scanned is illuminated at 45° by means of a light guide positioned in front of the optical system. Part of the light guide bundle is used for the intensity control of the light source. The radiation reflected off the object to be scanned is detected by a self-scanning photodiode array in integrated circuit technology, with each photodiode supplying a densitometric image of the scanned surface. For scanning such an object, the photodiode array in a scanning head is led in the X- and the Y-direction across the object. The signals derived from the photodiode array have to be subjected to several operations before they can be processed further in a data processing system. Two of these operations are known from the aforementioned patents, namely, black level correction and white level correction. It has been found, however, that crosstalk occurs between adjacent photodiodes of this type.

DISCLOSURE OF THE INVENTION

It is the object of the invention to provide a circuit arrangement of the above-described type, by means of which crosstalk is reduced to a negligible value. The circuit arrangement, according to the invention, utilizes the actual value $R_i$ of the signal derived from the ith cell, the actual values of the signals $R_{(i+1)}$ and $R_{(i-1)}$ derived from the (i+1)st and the (i−1)st cells, and a crosstalk factor (a) to compute a compensated signal value $$I_i \approx \frac{R_i - aR_{i+1} - aR_{i-1}}{1 - 2a - 2a^2}.$$

The arrangement is preferably accomplished in circuitry having a shift register with at least three outputs for storing the output of individual cells of the photodiode array. The first and the third outputs of the shift register are each connected to one inverter stage and one signal modifying control element supplying factor (a). The output of the first control element and the second output of the shift register are connected to a first adder, whose output is connected to one input of a second adder having its second input connected to the output of the second control element.

Figure 2:
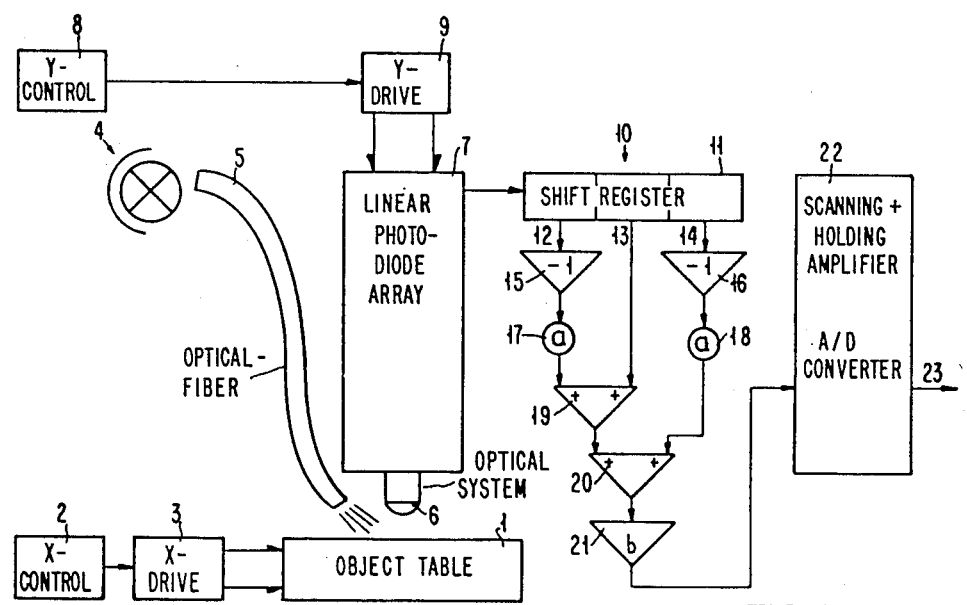
Figure 3:
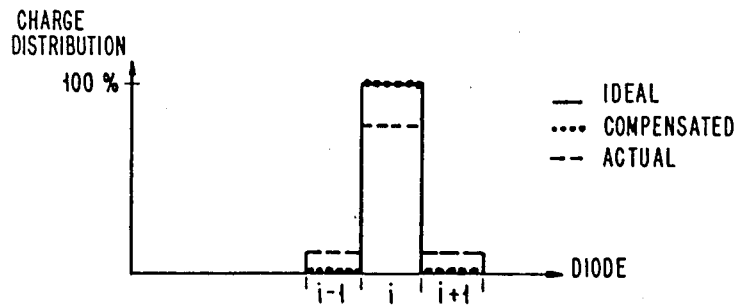

One way of carrying out the invention is described in detail below with reference to drawings which illustrate only one specific embodiment, in which FIG. 1 is a schematic of the charge distribution in adjacent diodes in the case of crosstalk, FIG. 2 is a circuit arrangement for crosstalk compensation, and FIG. 3 is a representation of a pulse function with 10% crosstalk.

When a photodiode array is illuminated, photons are detected in the individual photodiodes. These photons are not limited to the illuminated photodiode cell but migrate to the adjacent cells. Thus, illumination of the ith cell leads to a charge portion of (a) in the (i−1)st cell and coonsequently to a charge portion of (a) in the (i+1)st cell. Similarly, illumination of the (i−1)st cell leads to a corresponding portion (a) in the ith cell; upon illumination of the (i+1)st cell, a charge portion (a) occurs in the ith cell and, of course, also in the (i+2)nd cell. The charge distribution obtained is shown in FIG. 1. Thus, the charge distribution for diode I in FIG. 1 is $$R_i = I_i - 2aI_i + aI_{i-a} + aI_{i+a} \tag{1}$$

where $I_i$ is the ideal charge. From equation (1), first approximation correction is derived as follows:

$$R_i - aR_{i+1} - aR_{i-1} = I_i(1 - 2a - 2a^2) + \tag{2}$$

$$I_{i+1} \cdot 2a^2 - I_{i-1}a^2 + I_{i-1} \cdot 2a^2 - I_{i-1}a^2$$

for lower values of a (a<0.1 or less than 10% crosstalk), the ideal signal is $$I_i \approx \frac{R_i - aR_{i+1} - aR_{i-1}}{1 - 2a - 2a^2} \tag{3}$$

The circuit arrangement for implementing this method will be described in detail below.

A table 1, on which the object to be scanned may be positioned, is shifted in the X-direction, using, for example, an X-control 2 and an X-drive 3. For illuminating the object table 1, a light source 4 is provided, whose light is directed through a light guide bundle 5 onto the object table. An optical system 6 is provided in conjunction with a linear photodiode array 7 which is shifted in the Y-direction by a Y-control 8 and a Y-drive 9. It is, of course, also possible to have a stationary object table and to shift the optical system with the photodiode array in the X- and the Y-direction.

The object scanned by the optical system 6 produces charges in the individual cells of the photodiode array according to the intensity of the radiation reflected off the object. These charges are fed under clock control to a correction or compensation circuit 10. This compensation circuit 10 comprises a shift register 11 with three outputs 12, 13 and 14. The first and the third output of the shift register are connected to one inverter stage each 15 and 16, respectively, to the output of which one signal modifying control element each is connected 17 and 18, respectively. The factor (a) from equation 3 may be set in these signal modifying control elements 17 and 18. A first adder 19 is connected to the output of signal modifying control element 17 and to the output 13 of shift register 11. The output of the first adder 19 and the output of the second signal modifying control element 18 are connected to the two inputs of a second adder 20. The output of adder 20 has connected to it an amplifier stage 21 with the amplification factor $$b = \frac{1}{1 - 2a - 2a^2}.$$

By means of this logic circuit, the value $I_i$ can be determined for each signal read from a cell of the photodiode array. The signal thus determined is fed to a scanning and holding amplifier stage 22 and to an analog-to-digital converter 23, and can be subsequently processed as usual in a digital form.

This is the most advantageous way of processing the output signals of the linear photodiode array. However, it is also possible for the scanning and holding stage 22 with its analog-to-digital converter 23 to be positioned between the photodiode array 7 and the shift register 11. In the latter case, a digital, rather than an analog, signal would be corrected in the compensation circuit 10.

The results will be explained in detail below with reference to FIG. 3. The solid line in FIG. 3 shows the ideal charge distribution of the ith diode. As previously mentioned, such an ideal charge distribution is not attainable in practice. The actual distribution of the charges to the (i−2)st, the ith and the (1+1)st cell is marked by broken lines. After crosstalk compensation, the charge distribution according to the dash-dotted lines is obtained.

This is also shown in Table I.

| Diode | Actual | Ideal | Compensated |
|-------|--------|-------|-------------|
| i − 1 | 10%    | 0%    | 2.6%        |
| i     | 80%    | 100%  | 100%        |
| i + 1 | 10%    | 0%    | 2.6%        |

Thus, the detrimental crosstalk between adjacent cells of a linear photodiode array is almost completely compensated for by the new compensation circuit.

What is claimed is:

1. In an electro-optical scanner having a linear array of photodetector cells, each of said cells having means for producing a signal R related to light intensity, said array including adjacent cells (i−1), (i) and (i+1) which produce signals of value $R_{(i-1)}$, $R_{(i)}$ and $R_{i+1)}$, a circuit arrangement for crosstalk compensation comprising:
   (a) means for storing the value $R_{(i)}$ of the signal produced by cell (i) and the values $R_{(i-1)}$ and $R_{(i+1)}$ from adjacent cells (i−1) and (i+1) respectively; and
   (b) means, connected to said storing means, for producing a compensated output $I_i$ for cell (i) whereby $I_{(i)}$ is computed in accordance with the relationship $$I(i) \approx \frac{R_{(i)} - aR_{(i+1)} - aR_{(i-1)}}{1 - 2a - 2a^2}$$

wherein a is a constant factor determined by the degree of crosstalk between adjacent cells.

2. The circuit arrangement as described in claim 1 wherein said storage means comprises a shift register having first, second and third stages, each of said stages having an output connection, an inverter connected to the output of said first and third stages, control means connected to the outputs of the inverters for modifying the output signals thereof by the factor a, a first adder and a second adder, both of said adders having respective inputs and outputs, the inputs of said first adder being connected to the output of said second shift register stage and the output of the control means connected to said first inverter, the inputs of said second adder being connected to the output of said first adder and to the output of the control means connected to said second inverter.

3. The circuit arrangement as defined in claim 2 further comprising an amplifier connected to the output of said second adder and having an amplification factor b, wherein b is computed in accordance with the relationship $$b = \frac{1}{1 - 2a - 2a^2}$$

4. The circuit arrangement as defined in claim 1 further comprising an analog-to-digital converter, and means for delivering the compensated output $I_i$ to said analog-to-digital converter.

5. The circuit arrangement as defined in claim 1 wherein said photodetector array comprises a plurality of photodiodes.

* * * * *